(12) United States Patent
Icher et al.

(10) Patent No.: US 7,477,494 B2
(45) Date of Patent: Jan. 13, 2009

(54) ELECTRICAL DEVICE COMPRISING TWO SUPPORTS AND A CONNECTION TERMINAL CONNECTED TO A SERIES CAPACITOR AND TO A VOLTAGE LIMITER

(75) Inventors: François Icher, Grenoble (FR); Bruno Dehos, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 1221 days.

(21) Appl. No.: 10/440,495

(22) Filed: May 15, 2003

(65) Prior Publication Data

US 2004/0027736 A1   Feb. 12, 2004

(30) Foreign Application Priority Data

Jun. 14, 2002   (FR) ................... 02 07369

(51) Int. Cl.
*H02H 9/00* (2006.01)
(52) U.S. Cl. ................ 361/56; 361/91.1; 361/111
(58) Field of Classification Search .................. 361/15, 361/56, 91.1, 111
See application file for complete search history.

(56) References Cited

U.S. PATENT DOCUMENTS

| 5,706,163 | A | * | 1/1998 | Kalb et al. | ................. 361/313 |
| 5,731,945 | A | | 3/1998 | Bertin et al. | ................. 361/111 |
| 5,828,259 | A | | 10/1998 | Cases et al. | ................. 327/376 |
| 6,288,885 | B1 | * | 9/2001 | Jiang et al. | ................. 361/111 |
| 6,548,869 | B2 | * | 4/2003 | Brewer et al. | ................ 257/355 |
| 6,734,504 | B1 | * | 5/2004 | Lie et al. | .................... 257/355 |
| 6,801,416 | B2 | * | 10/2004 | Hatzilambrou et al. | ........ 361/56 |
| 7,221,549 | B2 | * | 5/2007 | Icher et al. | .................... 361/56 |

OTHER PUBLICATIONS

French Search Report, FA 619292/FR 0207369, dated Feb. 6, 2003.

* cited by examiner

*Primary Examiner*—Michael J Sherry
*Assistant Examiner*—Terrence R Willoughby
(74) *Attorney, Agent, or Firm*—Gardere Wynne Sewell LLP

(57) ABSTRACT

An electrical device includes two supports for electronic components. A first support bears at least one input terminal, an electric circuit connected to the input terminal and a voltage limiter. A second support bears at least one external connection terminal. The external connection terminal is connected to the input terminal by a capacitor, and the link between the capacitor and the external connection terminal includes a node connected to the voltage limiter device so as to limit a voltage between said node and a reference point of the electric circuit.

21 Claims, 2 Drawing Sheets

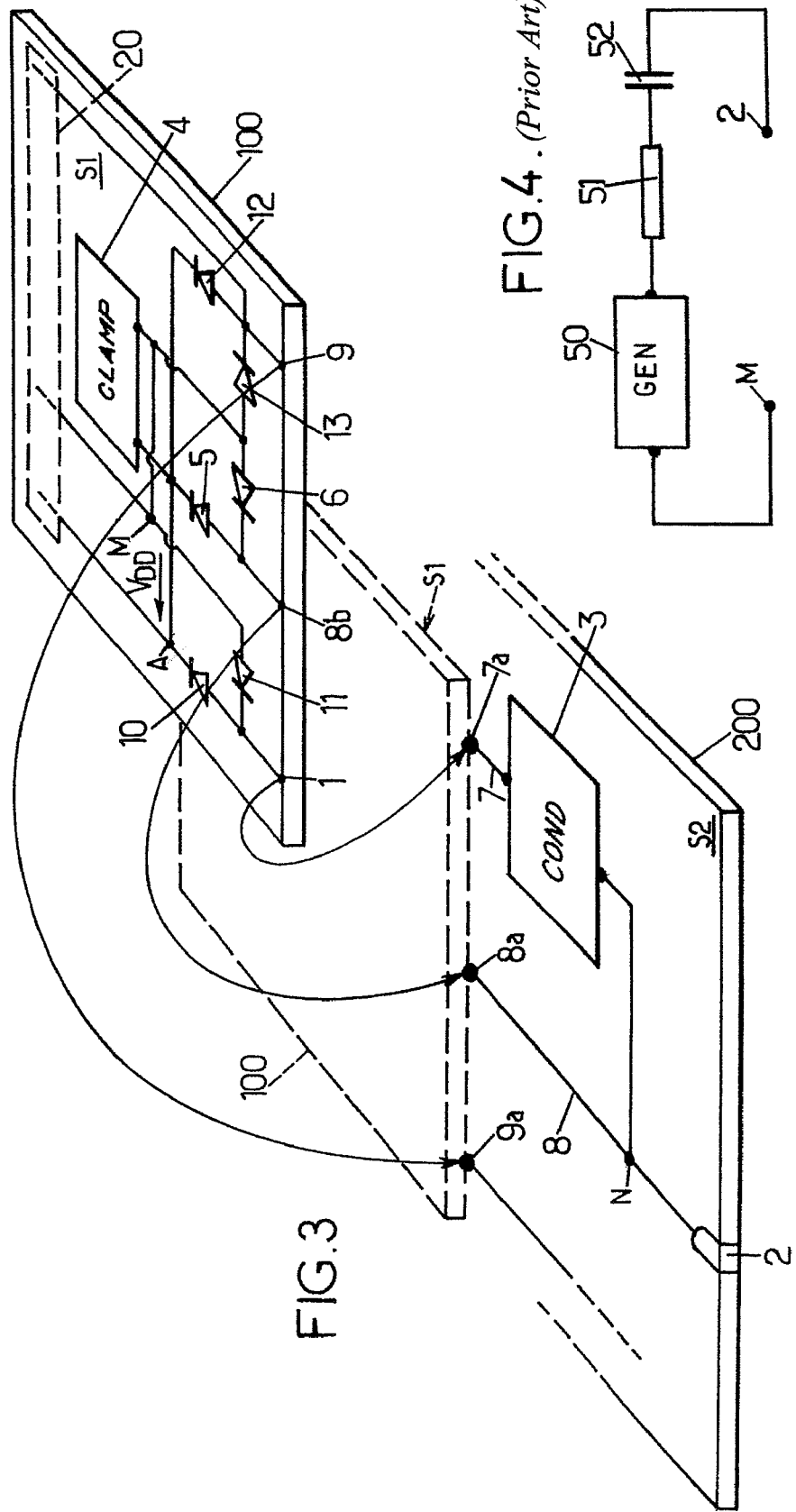

ELECTRICAL DEVICE COMPRISING TWO SUPPORTS AND A CONNECTION TERMINAL CONNECTED TO A SERIES CAPACITOR AND TO A VOLTAGE LIMITER

FOREIGN PRIORITY CLAIM

The present application claims foreign priority from French Application for Patent No. 02 07369 filed Jun. 14, 2002, the disclosure of which is hereby incorporated by reference.

BACKGROUND OF THE INVENTION

1. Technical Field of the Invention

The present invention relates to a device for protecting against electrostatic discharges to a capacitor placed in series at the input of an electric circuit. More particularly, the present invention relates to such a protection device for a circuit forming part of an electrical device having electronic components distributed over two supports.

2. Description of Related Art

It is common to use a capacitor connected in series at certain inputs of electric circuits, in particular to remove any D.C. components from the electrical signal applied to this input. Such a capacitor, called a series capacitor, is then inserted between an input terminal of said electric circuit and an external connection terminal.

Depending on their location within an electrical device, some connection terminals are susceptible to receiving electrostatic discharges. Electrostatic discharges may especially occur when the electrical device is handled by an operator. They may cause instantaneous voltages greater than 2000 volts, capable of damaging some components of the electrical device. It is therefore usual to connect a connection terminal to a device protecting against electrostatic discharges, or an ESD protection device.

The principle of an ESD protection device consists in opening a path for removing electrical charges between the connection terminal to which the ESD protection device is connected and a reference point in the electric circuit when the voltage between said connection terminal and this reference point exceeds a predefined threshold. In normal operation, an ESD protection device has no electrical effect, then being equivalent to an open circuit, but it limits the voltage between the connection terminal and the reference point in the presence of an electrostatic discharge. Such an ESD protection device is hereinafter called a voltage limiter.

For an input terminal of an electric circuit connected to an external connection terminal by a series capacitor, the connection of said external connection terminal to an ESD protection device makes it possible to prevent an electrostatic discharge occurring on the external connection terminal from causing breakdown of the series capacitor.

Now some electrical devices have several supports over which the electronic components of these devices are distributed. In particular, an external connection terminal connected to a series capacitor, as introduced above, may be borne by a support which does not itself bear ESD protection. In particular, this may be the case when the support for the external connection terminal is an insulator.

There exists a need for protecting a series capacitor connected to an external connection terminal against electrostatic discharges occurring on said external connection terminal with respect to electrical devices having several supports for electronic components.

SUMMARY OF THE INVENTION

The present invention relates to an electrical device comprising a first support bearing at least one input terminal, an electric circuit connected to the input terminal and a voltage limiter, and a second support bearing at least one external connection terminal, the external connection terminal being connected to the input terminal via a capacitor. According to the invention, the link between the capacitor and the external connection terminal comprises a node connected to the voltage limiter so as to limit the voltage between said node and a reference point of the electric circuit.

Thus, according to the invention, a special electrical connection connects the external connection terminal located on said second support to an ESD protection device located on said first support, so as to remove excessive electrical charge appearing on the external connection terminal to a reference point of the circuit.

In a particular embodiment of the invention, said node is connected to the voltage limiter by a first diode and is furthermore connected to the reference point by a second diode, the first diode having its cathode connected to the voltage limiter and its anode connected to said node, and the second diode having its cathode connected to said node and its anode connected to said reference point.

This method of linking the external connection terminal to the voltage limiter in particular makes it possible to use the same voltage limiter to protect the series capacitor and to protect the components placed at other input terminals of said electric circuit. Thus, the circuit may comprise at least one other input terminal connected, on the one hand, to the voltage limiter by a third diode and, on the other hand, to the reference point by a fourth diode, the third diode having its cathode connected to the voltage limiter and its anode connected to said other input terminal, and the fourth diode having its cathode connected to said other input terminal, and its anode connected to said reference point.

Optionally, the input terminal connected to the series capacitor may itself be protected in this way against the effects of electrostatic discharges. For this, said input terminal is connected to the voltage limiter and to the reference point by respective diodes, connected in the manner described above for any input terminal of the electric circuit.

The invention is for example particularly useful for electrical devices comprising first components advantageously produced on a semiconductor support and second components advantageously produced on an electrically insulating support.

The semiconductor support may be made of silicon, or based on silicon, and the first components may be diodes or transistors produced on the semiconductor support using to the normal methods for fabricating semiconductor components. In particular, the transistor-based ESD protection devices are normally prepared on a semiconductor support.

The insulating support may, for example, be made of glass. Second components requiring an insulating support in order to exhibit high quality factors are, for example, an antenna, especially a radiofrequency antenna, and a coil or inductor. In some cases, capacitors or metal tracks for fast carrying of signals may also be involved.

The two supports with their respective components are then fabricated separately, using technologies suited to each of them. They are then assembled to each other by making electrical connections between respective matching points of the two supports. By virtue of the invention, an external connection terminal borne by the insulating support may be connected to an ESD protection device prepared on the semiconductor support using known technologies for producing integrated semiconductor components.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 3 shows a placement of an electrical device according to the invention corresponding to the circuit diagram of FIG. 2; and FIG. 4 is a circuit diagram of a set-up for assessing the ability of the device of FIG. 3 to withstand pulses of electrical current.

DETAILED DESCRIPTION OF THE DRAWINGS

Identical references in several figures correspond to identical elements present in the figures in question. For the sake of clarity, the dimensions of the elements shown in the figures bear no relation to the actual dimensions.

Figure 1:
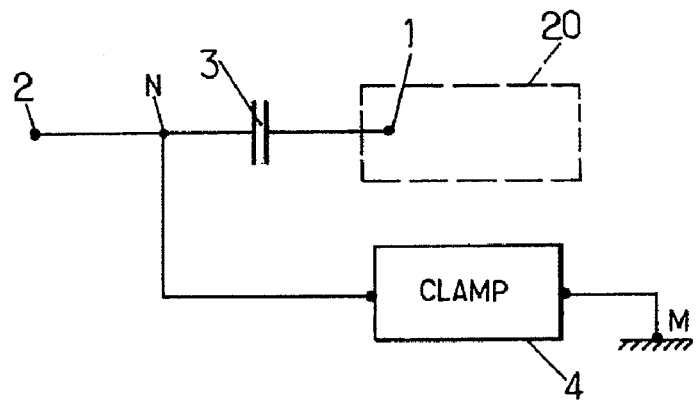
FIG. 1 is a first circuit diagram of a device with ESD protection according to the prior art, to which the invention may be applied.

According to the circuit diagram of FIG. 1, it is known to connect an external connection terminal 2 to a voltage limiter 4, otherwise called a "clamp", in order to limit an excessive voltage which may appear between the terminal 2 and a reference terminal, caused by an electrostatic discharge. Commonly, said reference terminal is an earth terminal M.

An electric circuit 20 may also be connected by an input terminal 1 of this circuit to the connection terminal 2. When it is necessary to ensure that the voltage applied to the input terminal 1 has no D.C. component, a series capacitor 3 is inserted between the input terminal 1 and the connection terminal 2. The link between the terminal 2 and the voltage limiter 4 then comprises a node N to which the series capacitor 3 is connected.

Figure 2:
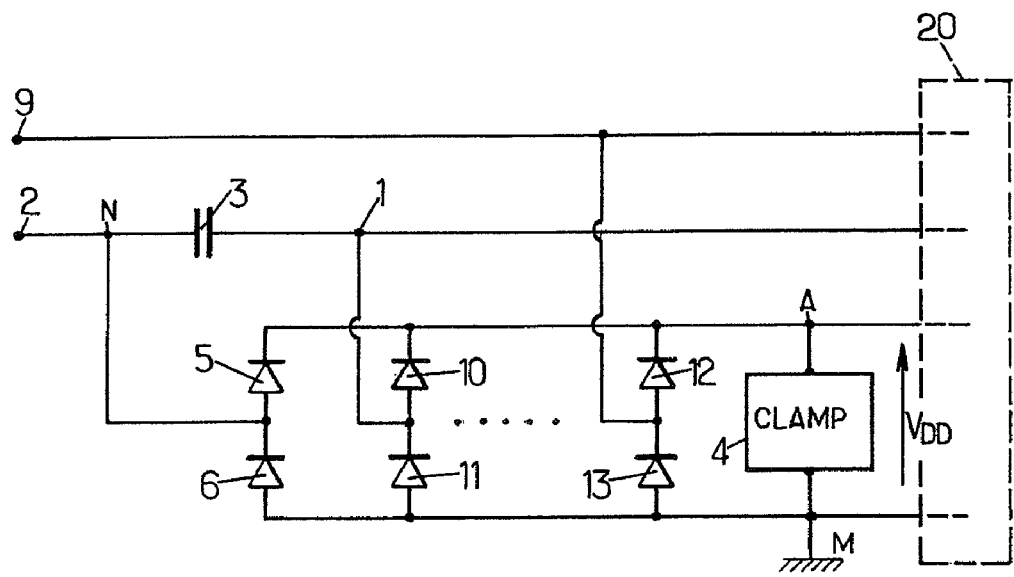
FIG. 2 is a second circuit diagram of a device with ESD protection according to the prior art, corresponding to an improvement of the device of FIG. 1.

FIG. 2 shows an improvement of the circuit diagram of FIG. 1, making it possible to connect several external connection terminals and/or several input terminals of the electric circuit 20 to the same voltage limiter 4, in order to protect the electronic components connected to these terminals against possible electrostatic discharges which may occur on the latter. According to the diagram of FIG. 2, the node N, the input terminal 1 and any additional input terminal 9 are connected on the one hand, to the voltage limiter 4 at point A shown by first respective diodes 5, 10 and 12, and on the other hand, to the earth terminal M by second respective diodes 6, 11 and 13. This structure is in particular adapted when a source (not shown) of positive voltage $V_{DD}$ is in addition connected between the point A and the earth terminal M, the terminals 1, 2 and 9 having respective voltages which are positive with respect to the earth terminal M and less than $V_{DD}$ in normal operation. Each of the diodes 5, 6, 10-13 is oriented so that it is off during normal operation of the electrical device, that is to say in the absence of electrostatic discharge on the terminals 1, 2 and 9.

The diodes 5, 10 and 12 allow excessive positive electrical charge arising at one or more of the terminals 1, 2 and 9 due to an electrostatic discharge associated with an overvoltage which is positive with respect to the earth terminal M to be evacuated towards the voltage limiter 4. The electrical charge carried by the capacitor plate 3 connected to the external connection terminal 2 is in particular limited in this way, preventing breakdown of the insulating dielectric of the capacitor 3. The diodes 6, 11 and 13 allow the direct removal towards the earth terminal M of excessive negative electrical charge appearing on at least one of the terminals 1, 2 and 9.

FIG. 3 is a placement diagram of one embodiment of the invention for an electrical device corresponding to FIG. 2, and comprising two different substrates on which electronic components are arranged. A first flat substrate 100, for example made of silicon, comprises integrated semiconductor components produced according to the fabrication methods known to a person skilled in the art on one of its surfaces S1. In particular, the substrate 100 and the components borne by this substrate may form an integrated circuit designed to carry out a particular application, called an ASIC (Application Specific Integrated Circuit). Apart from the components needed for executing the application, the voltage limiter 4 and the diodes 5, 6, 10-13 are also produced on the substrate 100, for example by using BI-CMOS technology combining bipolar components and field effect transistors. Producing the voltage limiter 4 from transistors arranged to switch from an off state to an on state when a voltage applied between two terminals of the voltage limiter becomes greater than a specific threshold is known to a person skilled in the art.

A second flat substrate 200, for example made of glass, bears on one of its surfaces S2 electronic components produced by successive depositions of insulators and metals in the form of superimposed layers. These layers are etched so as to form said electronic components connected together according to the circuit diagram of FIG. 2. These electronic components may include an RF antenna (not shown) which has a high quality factor by virtue of the insulating nature of the substrate 200.

At one point of its periphery, the substrate 200 bears a contact zone which forms the external connection terminal 2. The terminal 2 is intended, for example, to produce an electrical connection by wire bonding with an external support, for example of the PCB (Printed Circuit Board) type. In the embodiment of the invention in question, the series capacitor 3, connected on the one hand to the external connection terminal 2 and on the other hand to the input terminal 1 is borne by the insulating substrate 200. It consists of superimposed layer portions formed on the surface of the substrate 200, parallel to the surface S2, having two metal layer portions forming plates and separated by an insulating dielectric layer portion. The capacitance of the series capacitor 3 is between 100 picofarads and 10 nanofarads, for example.

In FIG. 3, the components borne by the substrates 100 and 200 are shown schematically by their electrical symbols, with no relation to the actual configuration of these components on the surfaces S1 and S2. Only the locations indicated for the input terminals 1, 2, 8b and 9 are significant with respect to the actual arrangement of these terminals.

The substrate 100 is placed above the substrate 200 with respect to the surface S2, parallel thereto and at a distance from S2 of about 0.1 millimeters, for example. The respective surfaces S1 and S2 of substrates 100 and 200, on which the electronic components are produced, are placed facing each other. To provide improved readability in FIG. 3, the substrate 100 is shown in a position which is turned over and moved aside from its actual location above the substrate 200. Its actual location is symbolized by dotted lines showing the outline of the substrate 100. Arrows respectively associate the three input terminals 1, 8b and 9 borne by the substrate 100 with three soldering beads 7a, 8a and 9a placed on the surface S2 of the substrate 200, with which the three input terminals 1, 8b and 9 are respectively in contact in the actual position of the substrate 100. These soldering beads 7a, 8a and 9a are known by the name "bumps" and provide electrical contact between the respective points of substrates 100 and 200 located facing each other.

In the embodiment described here, the conducting links respectively connecting the input terminal 1 to the capacitor 3 and the node N to a point of the substrate 100 each comprise a metal track, 7 and 8 respectively, formed on the surface of the substrate 100. Tracks 7 and 8 are made on the surface of the substrate 200 according to one of the methods known to a person skilled in the art, comprising, for example steps of etching, metal deposition and/or polishing.

In an alternative embodiment of the device of the invention, the capacitor 3 consists of a discrete component attached to the surface of the substrate 200, and connected to the terminals 1 and 2 by suitable electrical links which could be, for example, self-supporting metal wires.

Tests for ability to withstand electrostatic discharges have been carried out according to the "ESD Association Standard Test Method for Electrostatic Discharge (ESD) Sensitivity Testing—Human Model Component Level ESD STM 5.1 (1998)" standard on an electrical device as described above with reference to FIG. 3. According to this standard, a pulse of electrical current is produced by a current generator connected, on the one hand, to the external connection terminal 2 and, on the other hand, to the earth terminal M, according to the circuit diagram of FIG. 4. The generator 50 is connected to the terminal 2 via a 1.5 kilo-ohm resistor 51 and a 100 picofarad capacitor 52 connected in series.

The current pulse delivered by the generator 50 has a rapid increase in intensity lasting, for example, 10 nanoseconds, up to a maximum instantaneous value adjusted according to the required discharge voltage level. This discharge voltage level must be greater than 2.2 kilovolts without the electrical device tested being damaged, so as to guarantee its ability to withstand electrostatic discharges occurring when the device is handled by an operator.

The series capacitors 3 of the electrical devices subjected to the electrostatic discharge test have a capacitance of 150 picofarads.

For an electrical device corresponding to FIG. 3 but not having an electrical connection between the node N and the voltage limiter 4, for example in the absence of the track 8, breakdown of the insulating dielectric of the series capacitor 3 is systematically observed for current pulses associated with discharge voltage levels greater than 250 volts.

When the electrical device comprises an electrical link between the node N and the voltage limiter 4, as shown in FIG. 3, positive electrostatic discharges supplied by the generator 50 to the external connection terminal 2 are removed by the voltage limiter 4 to the earth terminal M. By way of example, for a voltage limiter 4 having a threshold voltage of 3 volts, the voltage between the external connection terminal 2 and the earth terminal M reaches a maximum value of 6.3 volts during electrostatic discharges corresponding to a voltage level of 880 volts. The difference between this maximum voltage value and the threshold of the voltage limiter 4 is due to a voltage of about 0.7 volts at the terminals of the diode 5 when the discharge current passes therethrough, and to a voltage developed within the electrical links through which the discharge current passes, especially the track 8. Simultaneously, the voltage between the input terminal 1 and the earth terminal M reaches a maximum value of about 3.8 volts. These low maximum values reached by the voltages between the connection terminal 2 and the earth terminal M, on the one hand, and between the input terminal 1 and the earth terminal M, on the other hand, ensure the insulating dielectric of the series capacitor 3 is preserved.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electrical device, comprising:
a first support bearing at least one input terminal, an electric circuit which is connected to the input terminal and a voltage limiter that are both formed on the first support; and
a second support bearing at least one external connection terminal, the external connection terminal being connected to the input terminal on the first support through a series connected capacitor formed on the second support;
wherein a connection between the capacitor and the external connection terminal comprises a node connected to the voltage limiter so as to limit the voltage between said node and a reference point of the electric circuit.

2. The device according to claim 1, wherein the capacitor is borne by the second support.

3. The device according to claim 2, wherein the capacitor comprises two superimposed metal layer portions formed on the surface of the second support and at least one insulating dielectric layer portion placed between the two metal layer portions.

4. The device according to claim 2, wherein a first conducting link connecting the input terminal to the capacitor comprises a metal track formed on the surface of the second support.

5. The device according to claim 2, wherein a second conducting link connecting said node to a point borne by the first support comprises a metal track formed on the surface of the second support.

6. The device according to claim 1, wherein the first support is silicon-based.

7. The device according to claim 1, wherein said node is connected to the voltage limiter by a first diode and connected to the reference point by a second diode, the first diode having its cathode connected to the voltage limiter and its anode connected to said node, and the second diode having its cathode connected to said node and its anode connected to said reference point; and wherein the input terminal is connected to the voltage limiter by a third diode and connected to the reference point by a fourth diode, the third diode having its cathode connected to the voltage limiter and its anode connected to said input terminal, and the fourth diode having its cathode connected to said input terminal and its anode connected to said reference point.

8. The device according to claim 7, comprising at least one other input terminal connected to the voltage limiter by a third diode and connected to the reference point by a fourth diode, the third diode having its cathode connected to the voltage limiter and its anode connected to said other input terminal, and the fourth diode having its cathode connected to said other input terminal, and its anode connected to said reference point.

9. The device according to claim 1, wherein said input terminal is connected to the voltage limiter by a first diode and connected to the reference point by a second diode, the first diode having its cathode connected to the voltage limiter and its anode connected to said input terminal, and the second diode having its cathode connected to said input terminal and its anode connected to said reference point.

10. The device according to claim 7, wherein the first support is silicon-based.

11. The device according to claim 10, wherein the first and second diodes are borne by the first support.

12. The device according to claim 1, wherein the capacitor is borne by the second support and wherein said node is connected to the voltage limiter by a first diode and connected to the reference point by a second diode, the first diode having its cathode connected to the voltage limiter and its anode connected to said node, and the second diode having its cathode connected to said node and its anode connected to said reference point.

13. The device according to claim 12, wherein the first support is silicon-based.

14. The device according to claim 13, wherein the first and second diodes are borne by the first support.

15. The device according to claim 1, wherein the second support is made of an electrical insulator.

16. The device according to claim 15, wherein the second support is made of glass.

17. An electrical device, comprising:
a first substrate of a first type including an external connection;
a series connected D.C. blocking capacitor formed on the first substrate having first and second terminals, the first terminal connected to the external connection;
a second substrate of a second type including an internal connection node;
an ESD protection circuit formed on the second substrate having first and second terminals, the first terminal connected to the internal connection node and the second terminal connected to a reference; and
a circuit connection formed on the second substrate between a connection with the second terminal of the D.C. blocking capacitor and the internal connection node of the second substrate.

18. The device of claim 17 wherein the second substrate is layered over the first substrate.

19. The device of claim 18 wherein the second substrate lays on top of the first substrate.

20. The device of claim 17 wherein the second type is silicon and the first type is glass.

21. The device of claim 17 wherein the second type is semi-conductive and the first type is insulative.

* * * * *